(12) United States Patent
Lee et al.

(10) Patent No.: US 7,546,108 B2
(45) Date of Patent: Jun. 9, 2009

(54) METHOD FOR SUPPORTING BACKWARD COMPATIBILITY OF MBMS

(75) Inventors: Kook-Heui Lee, Yongin-si (KR); Xiaoqiang Li, Haidian District (CN); Detao Li, Haidian District (CN); Chunying Sun, Haidian District (CN); Lixiang Xu, Haidian District (CN); Sung-Ho Choi, Suwon-si (KR)

(73) Assignees: Samsung Electronics Co., Ltd., Suwon-si (KR); Beijing Samsung Telecom R&D Center, Beijing (CN)

( * ) Notice: Subject to any disclaimer, the term of this patent is extended or adjusted under 35 U.S.C. 154(b) by 348 days.

(21) Appl. No.: 10/569,442

(22) PCT Filed: Aug. 25, 2004

(86) PCT No.: PCT/KR2004/002137

§ 371 (c)(1),
(2), (4) Date: Jun. 30, 2006

(87) PCT Pub. No.: WO2005/020461

PCT Pub. Date: Mar. 3, 2005

(65) Prior Publication Data

US 2006/0285512 A1 Dec. 21, 2006

(30) Foreign Application Priority Data

Aug. 25, 2003 (CN) ........................ 2003 1 0054674

(51) Int. Cl.
*H04B 15/00* (2006.01)
*H04B 1/26* (2006.01)
*H04B 4/00* (2006.01)
*H04W 4/00* (2006.01)
*H04B 7/00* (2006.01)

(52) U.S. Cl. ........................ 455/313; 455/525; 370/313; 370/328; 380/277

(58) Field of Classification Search ................. 455/313, 455/525; 370/313, 328; 380/277
See application file for complete search history.

(56) References Cited

U.S. PATENT DOCUMENTS 7,242,919 B2 * 7/2007 Kim et al. .................... 455/313

(Continued)

FOREIGN PATENT DOCUMENTS

EP        1353 520        10/2003

OTHER PUBLICATIONS

MAK Sumanasena et al., "Satin Approach in W-CDMA Adaptation for Broadcast and Multicast Based S-UMTS," Vehicular Technology Conference, 2002 Proceedings. VTC 2002 Fall, 2002 IEEE 56th, vol. 4, pp. 2220-2223, Sep. 24-28, 2002.

(Continued)

*Primary Examiner*—William D Cumming
(74) *Attorney, Agent, or Firm*—Roylance, Abrams, Berdo and Goodman, L.L.P.

(57) ABSTRACT

A method for supporting backward compatibility of Multimedia Broadcast and Multicast Service (hereinafter referred to as MBMS) in a mobile communication system of Wideband Code Division Multiple Access (hereinafter referred to as WCDMA) is disclosed. An example method recites mapping relationship between the MBMS service identifier and the RAB identifier and judging the capability of the RNC by the SGSN, and accordingly, determining if the MBMS service is backwards compatible and if user equipment is compatible with different versions.

8 Claims, 10 Drawing Sheets

U.S. PATENT DOCUMENTS

| | | | | |
|---|---|---|---|---|
| 2005/0090278 | A1* | 4/2005 | Jeong et al. | 455/525 |
| 2006/0104225 | A1* | 5/2006 | Kim et al. | 370/313 |
| 2006/0140411 | A1* | 6/2006 | Zhu | 380/277 |
| 2006/0285512 | A1* | 12/2006 | Lee et al. | 370/328 |

OTHER PUBLICATIONS

M. Chuah et al., "UMTS Release 99/4 Airlink Enhancement for Supporting MBMS Services," Communication 2004, IEEE Conference, vol. 6., Jun. 20-24, 2004, pp. 3231-3235.

3GPP TR WG3; Multimedia Broadcast Multicast Service, MBMS Requirements on backward compatibility and interworking, TSG-RAN Working Group 3 meeting #34, Feb. 17-21, 2003, R3-030208, Alcatel, Sophia Antipolis, France.

3 GPPTR 23.84 6.1.0 Technical Specification Group Services and System Aspect, Architecture and function description, (Release 6), Dec. 2002, Valbonne, France.

3 GPP TS 25.413 V3.13, Technical Specification Group Radio Access Network, UTRAN lu interface RANAP signaling, Jun. 2003, Release 1999, Valbonne, France.

* cited by examiner

METHOD FOR SUPPORTING BACKWARD COMPATIBILITY OF MBMS

BACKGROUND OF THE INVENTION

1. Field of the Invention

A method for supporting backward compatibility of Multimedia Broadcast and Multicast Service (hereinafter referred to as MBMS) in the mobile communication system of Wideband Code Division Multiple Access (hereinafter referred to as WCDMA) is proposed in the present invention. In order to guarantee the backward compatibility of MBMS and the compatibility among the equipments with different versions, the invention provides the method for obtaining the corresponding relationship between MBMS service identifier and Radio Access Bearer (hereinafter referred to as RAB) identifier by a Service GPRS (General Packet Radio Service) Support Node (hereinafter referred to as SGSN) and a User Equipment (hereinafter referred to as UE) when providing the MBMS service via a Radio Network Controller (hereinafter referred to as RNC) that does not support the MBMS.

2. Description of the Related Art

Multimedia Broadcast and Multicast Service (hereinafter referred to as MBMS) is a new service under standardization by $3^{rd}$ Generation Partnership Project (hereinafter referred to as 3GPP). The MBMS service is a unidirectional point-to-multipoint (p-t-m) service, whose most remarkable characteristic is that it can make use of radio resources and network resources efficiently.

FIG. 1 shows the MBMS system structure. The MBMS network structure, based on the core network of General Packet Radio Service (hereinafter referred to as GPRS), has been added with new network units. Following is the description on the MSMS system structure in FIG. 1.

Broadcast and Multicast Service Center 101 (hereinafter referred to as BM-SC) is a service control center of the MBMS system. Gateway GPRS Supporting Node 102 (hereinafter referred to as GGSN) and Service GPRS Supporting Node 103 (hereinafter referred to as SGSN) constitute the transmission network of the MBMS service and provide route for data transmission. UMTS Terrestrial Radio Access Network 104 (hereinafter referred to as UTRAN) provides radio resources for the MBMS service over the air-interface. User Equipment 105 (hereinafter referred to as UE) is the terminal device for data receiving. Home Location Register 106 (hereinafter referred to as HLR) saves the data related to users and can provide services like user authentication. Uu107 is the radio interface, and Iu108 represents the interface between the access network and the core network. Radio resources used by the MBMS service are not dedicated for one user, but for all users using this service.

For the interface Iu, all users that joins in the same MBMS service share the same user interface. That is to say, one Radio Network Controller (hereinafter referred to as RNC) has only one MBMS data stream for the same MBMS service. In the RNC and the SGSN, the relationship of one-to-one correspondence lies between the user interface and the MBMS service identifier and MBMS Bearer Context.

In the system of Re199, Re14 and Re15, the Network Service Access Point Identifier (hereinafter referred to as NSAPI) is one-to-one correspondent to the Radio Access Bearer (hereinafter referred to as RAB) identifier, and in the Packet Service domain (hereinafter referred to as PS domain), it is also one-to-one correspondent to the Radio Bearer (hereinafter referred to as RB) identifier. When the UE initiates the process of activating the Packet Data Protocol (hereinafter referred to as PDP) context, it selects an unused NSAPI and transfers it to the SGSN. When the SGSN initiates the process of RAB allocating, it contains the NSAPI into the information element of RAB identifier.

The process that an existing UE joins in the MBMS service is illustrated in FIG. 2.

201 the UE initiates the process of setting up the PDP Context. Having been established successfully, the PDP Context is saved in the UE, the SGSN and the GGSN, and a signaling connection in PS domain is established between the UE and the GGSN. The intermediate devices for the signaling connection are Radio Access Network (hereinafter referred to as RAN) and the SGSN.

202 the UE transmits an Internet Multicast Manage Protocol (hereinafter referred to as IGMP) joining in message to the GGSN through the signaling connection established in step 201. The message contains the parameter of Internet Protocol (hereinafter referred to as IP) multicast address, which can identify a certain MBMS multicast service or a certain multicast service in external data network.

203 the GGSN and the BM-SC perform the signaling interaction to authenticate the UE.

204 the GGSN sends an "MBMS Notification Request" message to the SGSN, which contains parameters of UE identifier and IP multicast address.

205 after receiving the message in step 204, the SGSN sends a "MBMS Context Activation Request" message to the UE, which contains parameters of UE identifier and IP multicast address.

206 after receiving the message in step 205, the UE sends an "Activate MBMS Context Request" message to the SGSN, which contains IP multicast address and Access Point Name (hereinafter referred to as APN).

207 the SGSN sends a "MBMS Notification Response" message to the GGSN, which contains the value of reason. The value of reason indicates whether the MBMS context is activated successfully or not for the reason of the SGSN or the UE. When receiving the response message of failure or the activation overtime in the GGSN, the GGSN can return to the IP Multicast Access (which is defined in 3GPP TS29.061).

208 If necessary, encryption process is performed between the UE and the SGSN.

209 the SGSN sends a "MBMS Context Establishment Request" message to the GGSN, which contains IP multicast address and APN.

210 the GGSN performs the signaling interaction with the BM-SC to authenticate the MBMS service and the UE after receiving the message in step 209.

211a If the GGSN has not established the bearer context for this MBMS service yet, it sends a "Bearer Request" message to the BM-SC, which contains IP multicast address and the APN.

211b The BM-SC sends a "Bearer Response" message to the GGSN, which contains bearer context information of this MBMS service. The BM-SC adds the identifier of this GGSN into the downlink node list of the BM-SC bearer context.

If this MBMS service has not yet been allocated with a Temporary Mobile Group Identifier (hereinafter referred to as TMGI), the BM-SC allocates a new one and transfers it to the GGSN and SGSN by the message of "Bearer Response", and to the UE by a message of "Activate MBMS Context Accept" (215).

If the state of the bearer context is activating, the BM-SC initiates the session start process with the GGSN.

212 the GGSN generates the MBMS UE context and sends a "MBMS Context Generation Response" message to the SGSN.

213a If the SGSN has not yet established the bearer context for this MBMS service, it sends the "Bearer Request" message to the GGSN, which contains the IP multicast address and the APN.

213b The BM-SC sends the "Bearer Response" message to the GGSN, which contains the MBMS bearer context information. The BM-SC adds the identifier of this GGSN into the downlink node list of the BM-SC bearer context.

If the state of the bearer context is activating, the BM-SC initiates the session start process with the GGSN.

214 if at least one RAB of PS domain has been established for this UE, the SGSN transfers the MBMS UE context information to the RAN.

215 the SGSN sends the "Activate MBMS Context Accept" message to the UE. The SGSN does not need to wait till the complete of step 212 to send this message.

In practical networks, it is possible that new equipments with MBMS capability coexist with the remnant ones that are in service currently. For instance, the SGSN that is capable of the MBMS can connect with the old version RNC. To guarantee the backward compatibility of the MBMS service and the interworking among the equipments with different versions, all old version equipments should provide the UE with the MBMS service through the mode of Re199.

But for the MBMS service, to activate the MBMS UE context when joining in the MBMS service, the UE discriminates the MBMS contexts and notifies the SGSN with the MBMS service identifier instead of selecting the NSAPI for the MBMS. Therefore, the SGSN has no NSAPI to utilize when establishing 1u user interface for UE with the process of Re199, and as there is no correspondence relation between the NSAPI and the RAB identifier, the UE has no idea in discriminating the services corresponding to the data from the bearers. The SGSN can not replace the RAB identifier directly with the MBMS service identifier, for a RAB identifier is 8-bit long, while an MBMS service identifier, such as TMGI, is 32-bit long.

SUMMARY OF THE INVENTION

The object of present invention is to provide a method for supporting backward compatibility of MBMS.

To realize above object, a method for supporting backward compatibility of MBMS comprising steps of:

receiving a message of "Session Start" from a GGSN by a SGSN when the SGSN requires to send MBMS data including MBMS Session Start to a UE;

receiving a message of "Activate MBMS Context Request" from the UE by the SGSN and sending a message of "Activate MBMS Context Accept" to the UE with the information exchange with the GGSN when the UE joins in the case of the MBMS session is in operation;

receiving a message of "Service Request" or a message "Routing Area Update" for the reason of "MBMS Service" from the UE by the SGSN when the UE move in with the MBMS session is in operation;

judging whether an interested RNC supports the MBMS or not by the SGSN;

sending the MBMS service to the interested UEs of the RNC in the mode of Re199 by the SGSN if the RNC cannot support the MBMS; and sending a message of "RAB Allocation Request" message to the RNC by the SGSN to establish 1u user interface bearer for the UE, this message contains RAB identifier of the UE corresponding to the MBMS service.

With the method of providing the mapping relationship between the MBMS service identifier and the RAB identifier and the method of judging the capability of the RNC by the SGSN proposed in the present invention, it is made possible that MBMS service is compatible backward and equipments are compatible with different versions. The method proposed in the present invention is simple, reasonable and backward compatible.

DETAILED DESCRIPTION OF THE PREFERRED EMBODIMENTS

In order to guarantee the backward compatibility of the MBMS and the interworking among the equipments with different versions, the present invention provided the method for the SGSN in finding out whether the RNC support the MBMS or not and for the SGSN in specifying the mapping relationship between the RAB identifier and the MBMS service identifier, comprising steps of allocating the mapping relationship between the MBMS service identifier and the RAB identifier by the SGSN and allocating the mapping relationship between the MBMS service identifier and the RAB identifier by the UE.

Above processes can be explained with figures. Flowcharts will be used to describe the operating process of nodes (including the SGSN and the UE).

Figure 1:
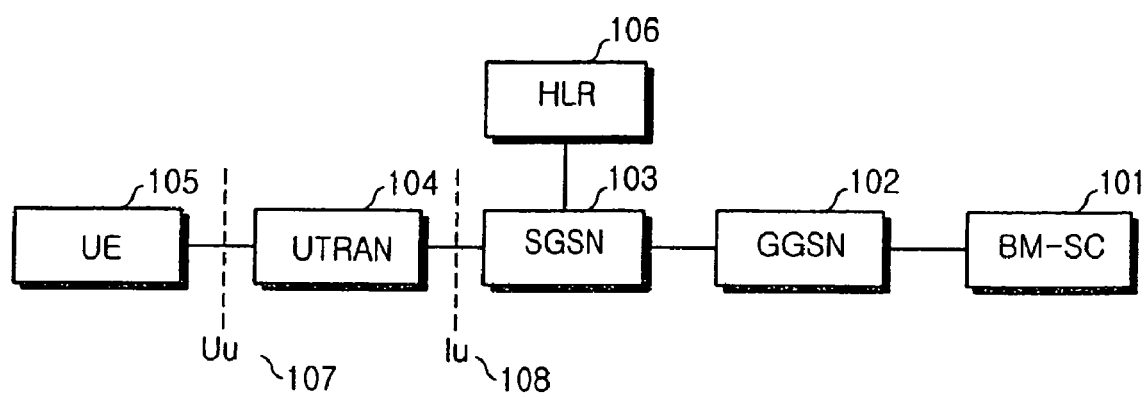
FIG. 1 is the view showing the logic network devices of the MBMS service
Figure 2:
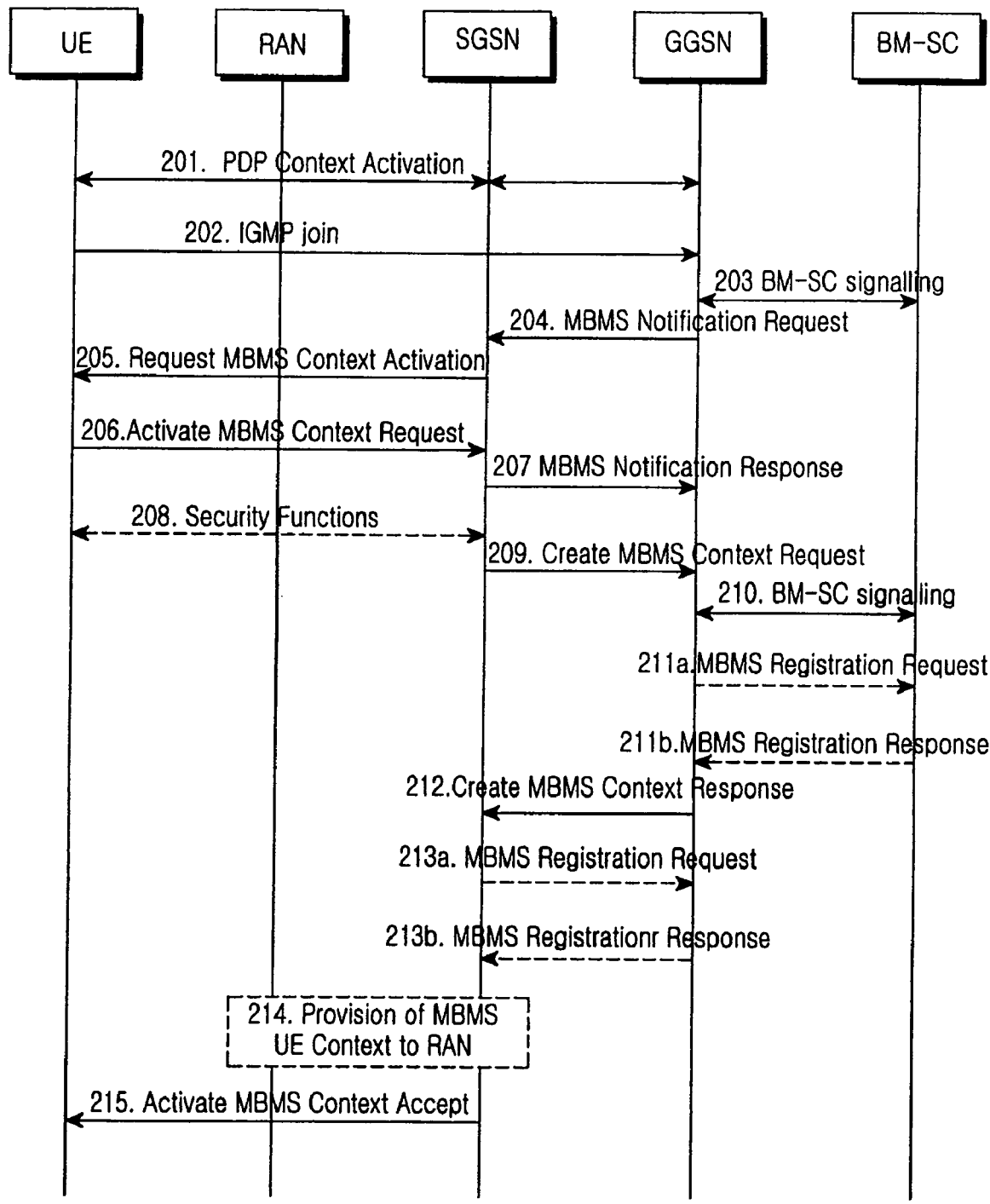
FIG. 2 illustrates the procedure that the existing UE joins in the MBMS service.
Figure 3:
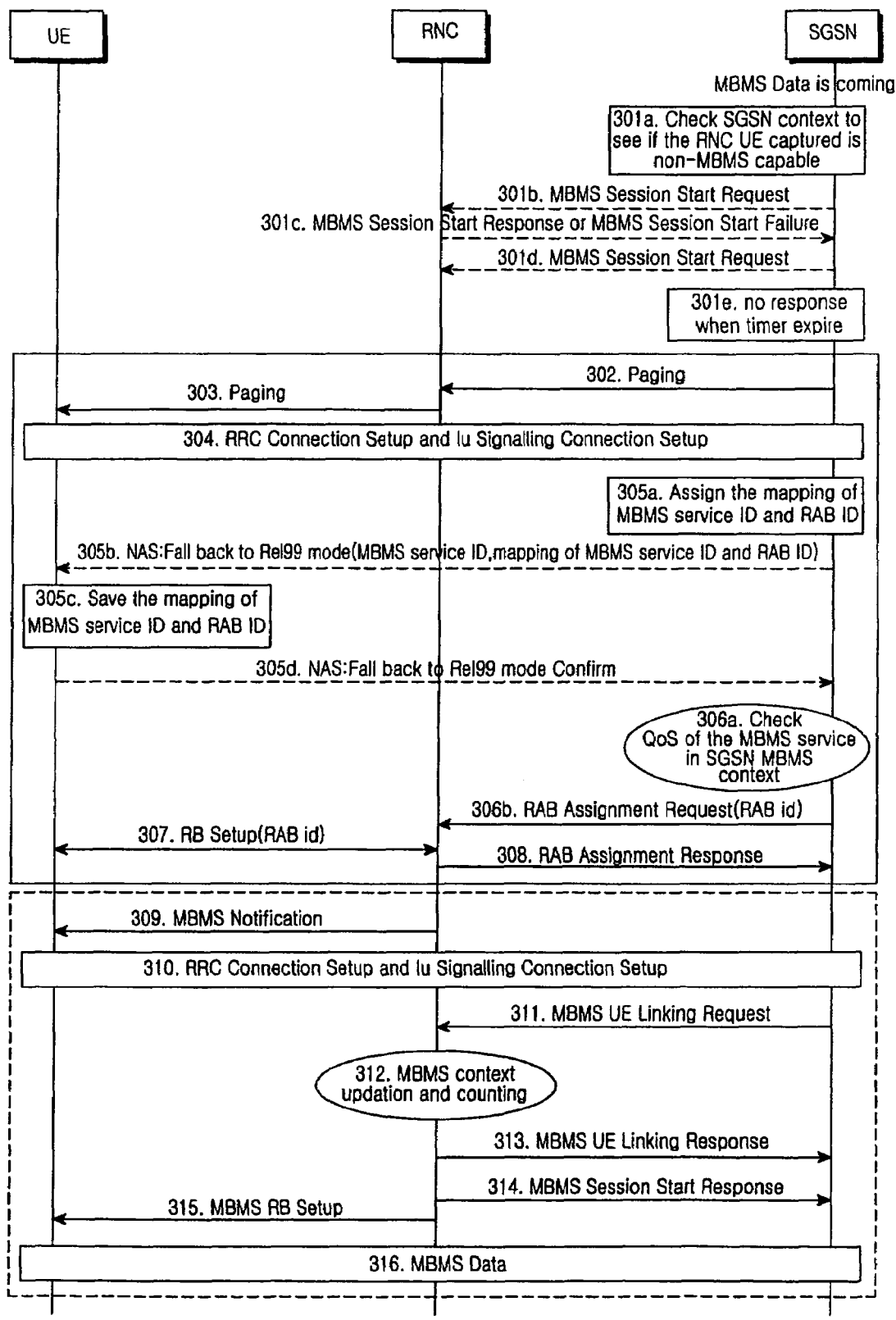
FIG. 3 shows the procedure that the SGSN derives the mapping of the MBMS service identifier and the RAB identifier.

FIG. 3 shows the process that the SGSN allocates the mapping relationship between the MBMS service identifier and the RAB identifier. When the MBMS data is to arrive (i.e., the SGSN receives the "MBMS Session Start Indication" message from the GGSN), or when the UE is joining in the MBMS service (i.e., the SGSN receives the "Activate MBMS Context Request" message from the UE, and sends the "Activate MBMS Context Response" message to the UE after it exchanges information with the GGSN, as shown from step 206 to 215 in FIG. 2), or when the UE is moving into the MBMS service (i.e., the SGSN receives the messages of "Routing Area Update", "MBMS Service Request" and so on from the UE with the reason of "MBMS Service"), following process will be conducted: the SGSN judges whether the RNC in which the UE locates supports the MBMS or not, provides the UE with the MBMS service in the mode of Re199 for the RNC not supporting the MBMS in the MBMS service area, and obtains the mapping relationship between the MBMS service identifier and the RAB identifier. In present invention, an example is taken to explain how the SGSN judges whether the RNC supports MBMS or not and how the SGSN allocates the mapping relationship between the MBMS service identifier and the RAB identifier when the MBMS session starts.

301 when transferring data, the SGSN receives the notification of data transmission from the GGSN in advance. At this time, the SGSN searches for the relevant MBMS context to notify the RNC that is specified in the context of the data transmission. There are three approaches in service for notifying RNC of data transmission, i.e., the SGSN allocates the request messages to the RNC by the message of MBMS notification, "MBMS Session Start" or "MBMS RAB Allocation Request". It is assumed that the approach of transferring the message of "MBMS Session Start" is adopted in the present invention.

Three methods can be utilized to inform the SGSN whether the RNC in which the interested UE locates supports the MBMS or not. 301a the SGSN saves the information on whether the RNC supports MBMS or not, and the SGSN can learn about whether the relevant RNC supports the MBMS or not by searching for the information on its context. 301b the SGSN sends a "MBMS Session Start Notification" message to the registered RNCs (indirectly or directly), and the RNCs that do not support the MBMS can not understand the message, they send a "MBMS Session Notification Refused" message to the SGSN at 301c. When the SGSN receives the "MBMS Session Notification Refused" message and the refused reason is "some information units can not be understood" from the RNC, if the MBMS service is in operation, the SGSN sends a "MBMS UE Connection Request" message to the RNC when the UE joins in or moves in. 301d the SGSN sets a timer after it sends the "MBMS Session Start Notification" to the RNC, and if the SGSN does not receive any response message from the RNC at the terminal time preset in the timer, it considers that the RNC does not support the MBMS at 301e. If the MBMS service is in operation, the SGSN sends the "MBMS UE Connection Request" message to the RNC when the UE joins in or moves in.

The message of "MBMS Session Start" described above may contain information on service identifier, RAB parameters, Quality of Service (hereinafter referred to as QoS) and so on. The detailed contents of the information do not have close relation with the present invention, so they are omitted in the following.

302-308 show the operation flow of the RNC that does not support the MBMS.

302 by using one of the approaches, if the RNC in which a certain interested UE locates does not support the MBMS and the UE stays in idle state, then the SGSN sends the "Paging" message to the RNC.

303 the RNC begins to page the UE via the Paging Control Channel (hereinafter referred to as PCCH) after it receives the "Paging" message from the SGSN.

304 If the UE stays in idle state, it initiates the process of establishing RRC connection (Radio Resource Control) while the 1u signaling connection is established for the UE.

305a, b the SGSN specifies the mapping relationship between the MBMS service identifier and the RAB identifier for the RNCs that do not support MBMS, and sends a "Return to Re199 Mode" message to notify the UE. This message contains the MBMS service identifier and the mapping relationship between the MBMS service identifier and the RAB identifier.

305c, d The UE saves the MBMS service identifier and the mapping relationship between the MBMS service identifier and the RAB identifier after it receives the message of "Return Re199 Mode" from the SGSN, and replies the SGSN with a message of "Return to Re199 Mode Conformation".

306a, b the SGSN initiates the process of establishing 1u user interface for the UE according to the QoS parameters corresponding to this MBMS context. The SGSN sends the "RAB Allocation Request" message to the RNC.

307 After receiving the "RAB Allocation Request" message from the SGSN, the RNC allocates the relevant radio resources and sends a "RB Establishment" message to the UE, and after receiving this message, the UE configures the corresponding resources and replies the RNC with a message of "RB Establishment Completion".

308 the RNC sends a "RAB Allocation Response" message to the SGSN.

309-316 show the operation flow of the RNC that support MBMS.

309 the RNC searches for this MBMS context after receiving the "MBMS Session Start" message from the SGSN (in this case, the RNC supports the MBMS). With the MBMS context, the RNC can learn about the number of joined UEs of each cell. The RNC determines whether to allocate resources in PTP or PTM mode according to the number of interested UEs of each cell. Here, the number of UEs is based on the pre-determined critical value of each cell. The RNC sends the message of "MBMS Notification" to every UE of the arriving of the data. If the number of UEs is greater than the critical value, the RNC determines to allocate resource in PTM mode and the process skips the next steps of 310, 311, 312 and 313 in this case. If the number of UEs is less than the critical value, part of UEs are switched into the connection mode by the "MBMS Notification" message. The particular method of switching the UE into the connection mode is beyond the present invention, so it is not described in detail here.

310 If the UE stays in idle state and is required to switch into the connection mode for the need of user counting, the UE initiates the process of the RRC connecting and the 1u signaling connection is established for the UE.

311 If the UE has established the RRC connection and 1u signaling connection for the MBMS service, the SGSN sends the "MBMS UE Connection Request" message to the RNC to make it initiate the process of MBMS UE connecting. The "MBMS UE Connection Request" message contains the service identifier list of MBMS that the UE joined in. This message can be transferred via the dedicated 1u signaling connection of the UE, thus the RNC can learn about the identifier of the UE by searching for the context after receiving this message.

312 the RNC adds the information of this UE into the corresponding MBMS contexts respectively according to the MBMS service identifier list. If the RNC has no service context corresponding to a certain MBMS service, it will create one for the MBMS service.

313 the RNC sends the "MBMS Connection Response" message to the SGSN.

314 the RNC counts the number of the interested UEs in the cell according to the MBMS context so as to determine whether to adopt the PTP transmission mode or the PTM one.

If the RNC has some UEs who joined in the MBMS service (corresponding to the described service when the MBMS session starts), it sends the Radio Access Network Application Part (hereinafter referred to as RANAP) message of "MBMS Session Start Response" to the SGSN.

315 the RNC establishes the radio bearer in the cell in which the user locate. It determines whether to establish PTP radio bearer or PTM one according to the number of users. Then, the RNC transfers the parameters of RB to the users of the cell. If the RNC determines to apply the PTM transmission mode in step 209, the parameters of RB can be transferred to the UE through the message of "MBMS Notification" in this step.

316 the MBMS data is transferred to the UEs from the core network via the established user interface.

Figure 4:
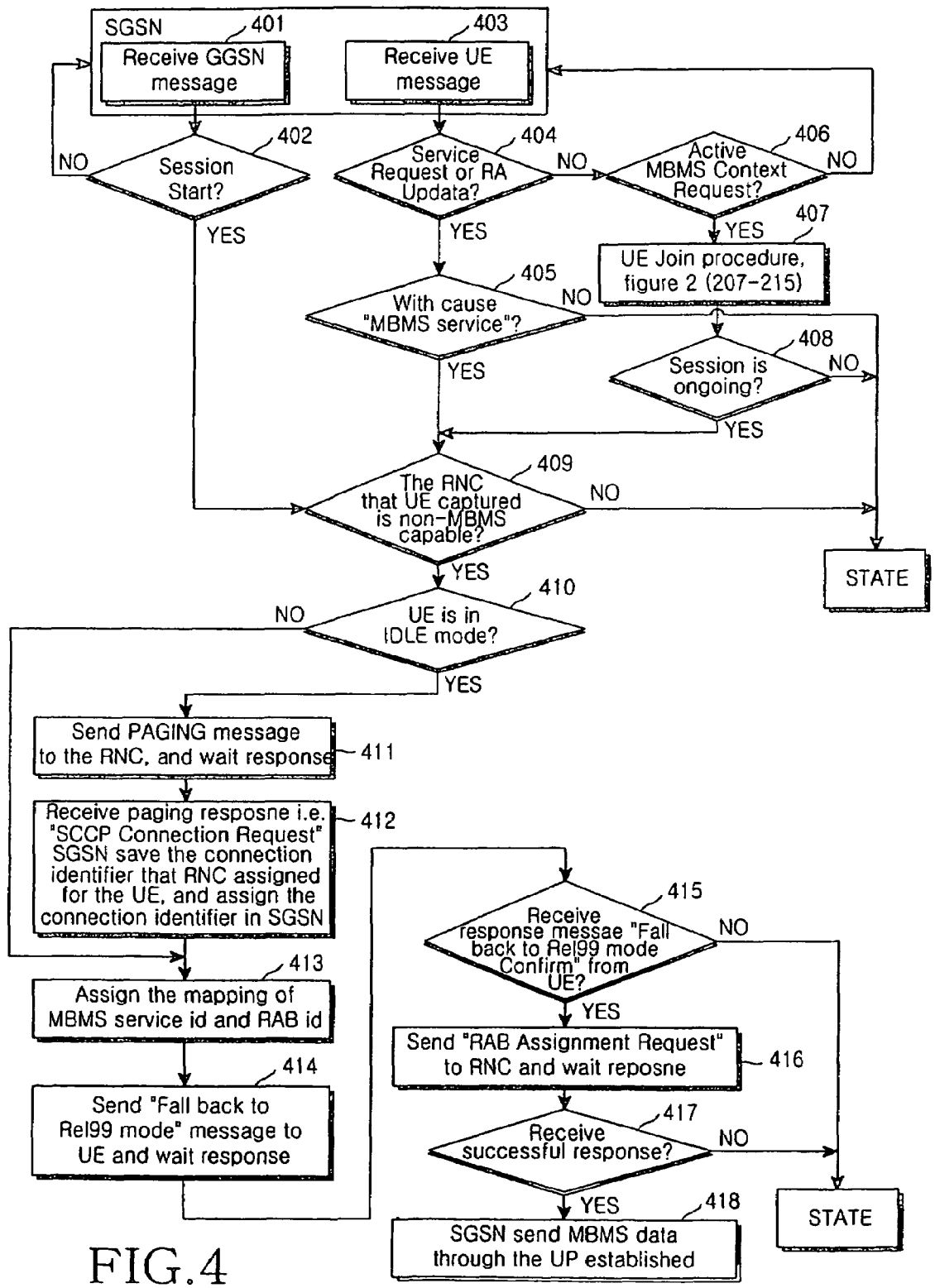
FIG. 4 shows SGSN operation during the procedure that SGSN derives the mapping of MBMS service identifier and the RAB identifier.

FIG. 4 shows the operation flow of the SGSN during the SGSN allocates the mapping relationship between MBMS service identifier and the RAB identifier.

401 the SGSN receives the message from the GGSN. 402 if the message that the SGSN receives from the GGSN is a message of "Service Start Indication", the process goes to 409; 403 the SGSN receives the message from the UE. 404 if the message that the SGSN receives from the UE is the message of "Service Request", "Routing Area Update", or the other messages that the UE sends to the SGSN when the mobile UE in idle state has not received the transmission mode or the RB parameters of the target cell. 405 the process goes to 409 if the reason for "Service Request" or "Routing Area Update" is "MBMS Service"; 406 if the SGSN receives the "Activate MBMS Context Request" message from the UE, 407 the SGSN sends a message of "Activate MBMS Context Conformation" to the UE through the process that it exchanges information with the GGSN and that GGSN exchanges information with the Broadcast and Multicast Service Center (hereinafter referred to as BM-SC) to complete the process that the UE joins in the MBMS service, as shown from step 207 to step 215 in FIG. 2. 408 if the MBMS service is in operation, the process goes to 409.

409 in the case that the UE joins in (406, 407) or moves in (403, 404) when the MBMS session starts or during the MBMS service, the SGSN needs to learn about whether the RNC in which the interested UE locates supports the MBMS or not.

There are three methods that make the SGSN judge whether the RNC in which the UE locates supports the MBMS or not. The first is that: the SGSN saves the information on whether the RNC supports MBMS or not, and the SGSN can learn about whether the RNC supports MBMS or not through searching for the information on its context. The second is that: the SGSN sends the "MBMS Session Start Notification" message to the registered RNCs (indirectly or directly), and if it is replies with the "MBMS Session Notification Refused" message for "Some information elements can not be understood", then the SGSN can learn about whether the RNC supports the MBMS or not. If the UE joins in or moves in during the MBMS service, the SGSN sends the "MBMS UE Connection Request" message to the RNC. The third is that: a timer is set after the SGSN sends the "MBMS Session Start Notification" message to the RNC, and if it is not responded from the RNC till the terminal of the timer, then it considers that the RNC does not support the MBMS. If the UE joins in or moves in during the MBMS service, the SGSN sends the "MBMS UE Connection Request" message to the RNC.

If the RNC in which the UE locates does not support the MBMS and the UE locates in the service area of the relevant MBMS, the SGSN provides the MBMS service to the UE in the mode of Re199.

410 performing step 411 for the UEs in idle state. If the UE is in PMM connection mode, the process goes to 413.

411 the SGSN sends the "Paging" message to the RNC that the UE joins in.

412 After receiving a "Paging Respond" message, the SGSN saves the signaling connection identifier that RNC allocates to this UE and allocates the signaling connection identifiers in the SGSN.

413 the SGSN specifies the mapping relationship between the MBMS service identifier and the RAB identifier for the RNCs that do not support the MBMS. 414 the SGSN notifies the UE of "Return to Re199 Mode". This message contains the MBMS service identifier and the mapping relationship between the MBMS identifier and the RAB identifier.

415 If the message that the SGSN receives from the UE is the "Return to Re199 Mode Conformation" message and 416 the SGSN initiates the process of establishing the user interface 1u, then the SGSN sends the "RAB Allocation Request" message to the UE and waits for the response.

417 If the SGSN is responded with the message of "RAB Allocation Response", then the RAB allocation has been completed successfully. 418 the SGSN transfers the MBMS data to the RNC via the established user interface.

Figure 5:
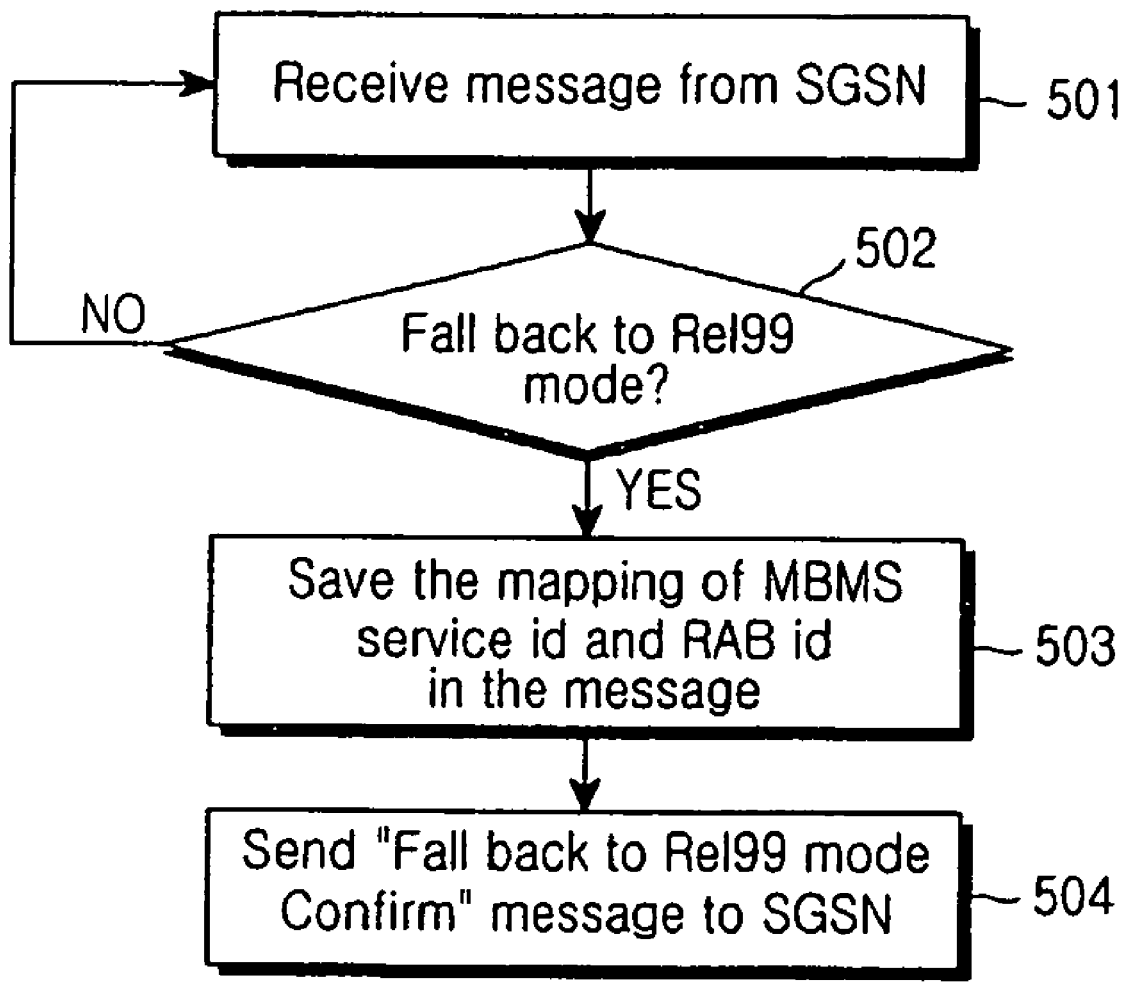
FIG. 5 shows the UE operation during the procedure that the SGSN derives mapping of the MBMS service identifier and the RAB identifier.

FIG. 5 shows the operation flow of the UE during the process that the SGSN allocates the mapping relationship between MBMS identifier and the RAB identifier

501 the UE receives message from the SGSN. 502 If the NAS message that UE receives from the SGSN is the message "Return to Re199 Mode", 503 then the UE saves the correspondence relationship between the MBMS service identifier and the RAB identifier. 504 the UE sends the NAS message of "Return to Re199 Mode Conformation" to the SGSN.

The actions performed by the RNC when the SGSN allocates the mapping relationship between the MBMS service identifier and the RAB identifier are just the same as that of the prior art, and detailed technical contents are omitted here.

Figure 6:
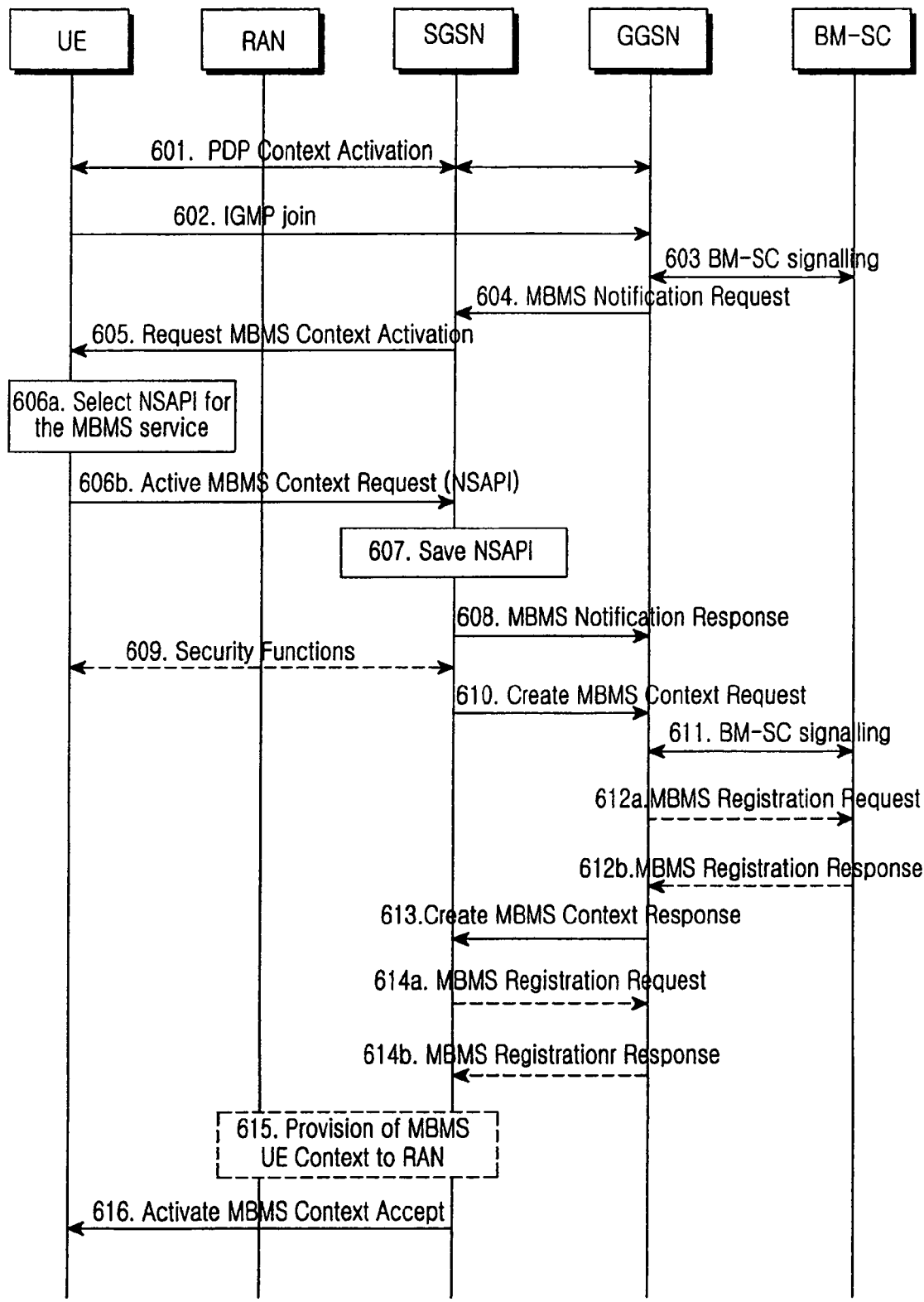
FIG. 6 shows The procedure that the UE derives the mapping of MBMS service identifier and the RAB identifier.

FIG. 6 shows the process that the UE allocates the mapping relationship between the MBMS service identifier and the RAB identifier. When joining in the MBMS service, the UE selects an unused NSAPI and sends it to the SGSN. If the RNC of the cell where the UE locates in does not support the MBMS, then when SGSN initiates the process of RAB allocating, the NSAPI is included in the information element of the RAB identifier.

601 the UE initiates the process of establishing the PDP Context. Having been established successfully, the PDP Context is saved in the UE, the SGSN and the GGSN, and the signaling connection in PS domain is established between the UE and the GGSN. The intermediate devices for the signaling connection are the RAN and the SGSN.

602 the UE sends the message of "IGMP Joining" to the GGSN via the signaling connection established in step 601. This message contains the parameter of IP Multicast Address, which can identify a certain MBMS service or a certain multicast service of the external data network.

603 the GGSN and the BM-SC perform the signaling interaction to authenticate the UE.

604 the GGSN sends the "MBMS Notification Request" message to the SGSN, which contains the parameters of the UE identifier and the IP multicast address.

605 after receiving the message in step 604, the SGSN sends the message of "MBMS Context Activation Request" to the UE, which contains the UE identifier and the IP multicast address.

606a, b after receiving the message in step 605, the UE selects the unused NSAPI for this MBMS service. The message of "Activate MBMS Context Request" is sent to the SGSN, which contains the IP multicast address, the APN and the NSAPI.

607 after receiving the message in step 605, the SGSN saves the NSAPI that the UE selects for this MBMS service. This NSAPI is utilized when the SGSN needs to provide this MBMS service to the UE with the Re199 mode. The application method of the NSAPI is in accordance with the existing standards.

608 the SGSN sends the "MBMS Notification Response" message to the GGSN. This message contains the value of reason which indicates whether the MBMS context is activated successfully for the SGSN or the UE or not. Once receiving the response message of failure or the activation overtime in the GGSN, the GGSN can return the IP Multicast Access (which is defined in 3GPP TS29.061).

609 If necessary, the encryption process is performed between the UE and the SGSN.

610 the SGSN sends the message of "MBMS Context Establishment Request" to the GGSN, which contains the IP multicast address and the APN.

611 the GGSN performs the signaling interaction with the BM-SC to authenticate the MBMS service and the UE after receiving the message in step 609.

612a If the GGSN has not established the bearer context for this MBMS service yet, it sends the "Bearer Request" message to the BM-SC, which contains the IP multicast address and the APN.

612b The BM-SC sends the "Bearer Response" message to the GGSN, which contains the bearer context information of this MBMS service. The BM-SC adds the identifier of this GGSN into the downlink node list of the BM-SC bearer context.

If this MBMS service has not yet been allocated with the TMGI, the BM-SC allocates a new one and transfers it to the GGSN and the SGSN by the message of "Bearer Response", and to the UE by the message of "Activate MBMS Context Accept" further (615).

If the state of the bearer context is activating, the BM-SC initiates the session start process with the GGSN.

613 the GGSN generates the MBMS UE context and transfers the "MBMS Context Generation Response" message to the SGSN.

614a If the SGSN has not yet established the bearer context for this MBMS service, it sends the "Bearer Request" message to the GGSN. This message contains the IP multicast address and the APN.

614b The BM-SC sends the "Bearer Response" message to the GGSN, which contains the MBMS bearer context information. The BM-SC adds the identifier of this GGSN into the downlink node list of the BM-SC bearer context.

If the state of the bearer context is activating, the BM-SC initiates the session start process with the GGSN.

615 If at least one RAB of the PS domain has been established for this UE, the SGSN transfers the MBMS UE context information to the RAN.

616 the SGSN sends the "Activate MBMS Context Accept" message to the UE. The SGSN does not need to wait till the complete of step 612 to send this message.

Figure 7:
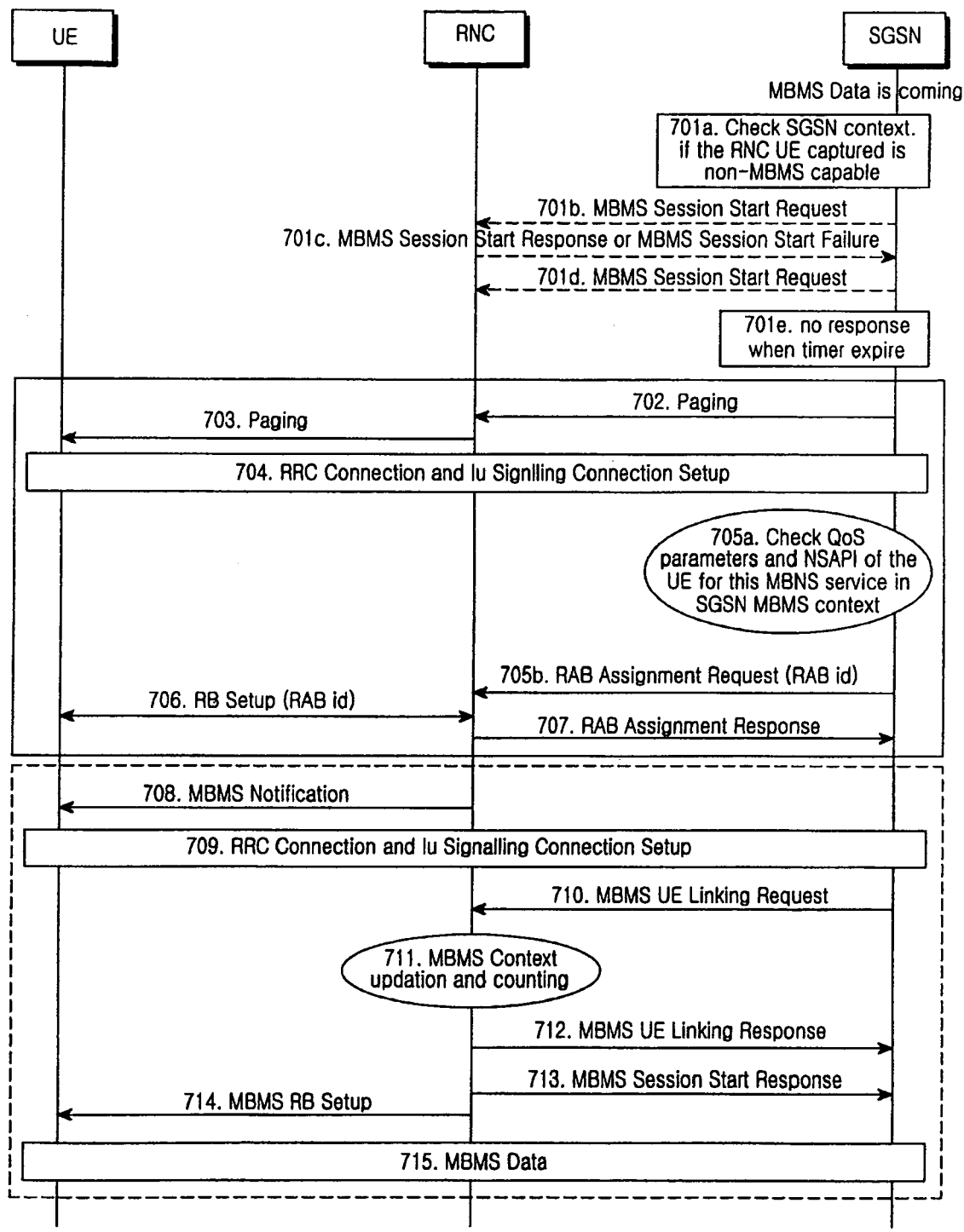
FIG. 7 shows MBMS session start signaling flow in case of UE derives the mapping of MBMS service identifier and the RAB identifier.

Corresponding to the process that the UE allocates the mapping relationship between the MBMS service identifier and the RAB identifier, the UE selects the unused NSAPI and transfers it to the SGSN, and the SGSN saves this NSAPI. When the MBMS data is to arrive (i.e., the SGSN receives the "MBMS Session Start Indication" message from the GGSN), or when the UE is joining in the MBMS service (i.e., the SGSN receives the "Activate MBMS Context Request" message from the UE, and sends the "Activate MBMS Context Response" message to the UE after it exchanges information with the GGSN, as shown form step 206 to 215 in FIG. 2), or when the UE is moving into the MBMS service (i.e., the SGSN receives the messages of "Routing Area Update", "MBMS Service Request" one and so on with the reason of "MBMS Service"), the SGSN provides the UE with the MBMS service in the mode of Re199 on condition that the UE locates in the MBMS service area but the RNC in which the UE locates does not support the MBMS. When the SGSN applies the message of "RAB Allocation Request" to establish the user interface for this service, NSAPI is included in the information element of the RAB identifier. In the present invention, the process of the MBMS session start is taken as an example to explain the relevant signaling flow, as shown in FIG. 7.

701 When transferring data, the SGSN receives the notification of data transfer from the GGSN in advance. At this time, the SGSN searches for the relevant MBMS context to notify the RNC that is specified in the context of the data transmission. There are three approaches in service for notifying the RNC of the data transmission: i.e., the SGSN allocates the request messages to the RNC by the message of MBMS notification, "MBMS Session Start" or "MBMS RAB Allocation Request". It is assumed that the approach of transferring the message of "MBMS Session Start" is adopted in the present invention.

Three methods can be utilized to inform the SGSN whether the RNC in which the interested UE locates supports the MBMS or not. 701a the SGSN saves the information on whether the RNC supports MBMS or not, and the SGSN can learn about whether the relevant RNC supports the MBMS or not by searching for the information on its context. 701b the SGSN sends the "MBMS Session Start Notification" message to the registered RNCs (indirectly or directly), and the RNCs that do not support the MBMS can not understand the message, they send the "MBMS Session Notification Refused" message to the SGSN at 701c. When the SGSN receives the "MBMS Session Notification Refused" message and the refused reason is "some information units can not be understood" from the RNC, if the MBMS service is in operation, the SGSN sends the "MBMS UE Connection Request" message to the RNC when the UE joins in or moves in. 701d the SGSN sets the timer after it sends the "MBMS Session Start Notification" to the RNC, and if the SGSN does not receive any response message from the RNC at the terminal time preset in the timer, it considers that the RNC does not support the MBMS at 701e. If the MBMS service is in operation, the SGSN sends the "MBMS UE Connection Request" message to the RNC when the UE joins in or moves in.

The message of "MBMS Session Start" described above may contain information on service identifier, RAB parameters, Quality of Service and so on. The detailed contents of the information do not have close relation with the present invention, so they are omitted in the following.

702-707 show the operation flow of the RNC that does not support the MBMS.

702 by using one of the approaches, if the RNC in which a certain interested UE locates does not support the MBMS and the UE stays in idle state, then the SGSN sends the "Paging" message to the RNC.

703 the RNC begins to page the UE via the PCCH after receiving the "Paging" message from the SGSN.

704 If the UE stays in idle state, it initiates the process of establishing RRC connection while the 1u signaling connection is established for the UE.

705a, b the SGSN initiates the process of establishing 1u user interface for the UE according to the QoS parameters corresponding to this MBMS context. The SGSN sends the "RAB Allocation Request" message to the RNC. The NSAPI is included in the information element of RAB identifier.

706 After receiving the "RAB Allocation Request" message from the SGSN, the RNC allocates the relevant radio resources and sends the "RB Establishment" message to the UE, and after receiving this message, the UE configures the corresponding resources and replies the RNC with the message of "RB Establishment Completion".

707 the RNC sends the "RAB Allocation Response" message to the SGSN.

708-714 show the operation flow of the RNC that support MBMS, which is in accordance with the prior art (as the corresponding step 309-315 in FIG. 3).

708 the RNC searches for this MBMS context after receiving the "MBMS Session Start" message from the SGSN (in this case, the RNC supports the MBMS). With the MBMS context, the RNC can learn about the number of joined UEs of each cell. The RNC determines whether to allocate resources in PTP or PTM mode according to the number of interested UEs of each cell. Here, the number of UEs is based on the predetermined critical value of each cell. The RNC sends the message of "MBMS Notification" to every UE of the arriving of the data. If the number of UEs is greater than the critical value, the RNC determines to allocate resource in PTM mode and the process skips the next steps of 709, 710, 711 and 712 in this case. If the number of UEs is less than the critical value, part of UEs is switched into the connection mode by the "MBMS Notification" message. The particular method of switching the UE into the connection mode is beyond the present invention, so it is not described in detail here.

709 If the UE stays in idle state and is required to switch into the connection mode for the need of user counting, the UE initiates the process of the RRC connecting and the 1u signaling connection is established for the UE.

710 If the UE has established the RRC connection and 1u signaling connection for the MBMS service, the SGSN sends the "MBMS UE Connection Request" message to the RNC to make it initiate the process of MBMS UE connecting. The "MBMS UE Connection Request" message contains the service identifier list of MBMS that the UE joined in. This message can be transferred via the dedicated 1u signaling connection of the UE, thus the RNC can learn about the identifier of the UE by searching for the context after receiving this message.

711 the RNC adds the information of this UE into the corresponding MBMS contexts respectively according to the MBMS service identifier list. If the RNC has no service context corresponding to a certain MBMS service, it will create one for the MBMS service.

712 The RNC sends the "MBMS Connection Response" message to the SGSN.

713 the RNC counts the number of the interested UEs in the cell according to the MBMS context so as to determine whether to adopt the PTP transmission mode or the PTM one. If the RNC has some UEs who joined in the MBMS service (corresponding to the described service when the MBMS session starts), it sends the RANAP message of "MBMS Session Start Response" to the SGSN.

714 the RNC establishes the radio bearer in the cell in which the user locate. It determines whether to establish PTP radio bearer or PTM one according to the number of users. Then, the RNC transfers the parameters of RB to the users of the cell. If the RNC determines to apply the PTM transmission mode in step 209, the parameters of RB can be transferred to the UE through the message of 209 "MBMS Notification" in this step.

715 the MBMS data is transferred to the UEs from the core network via the established user interface. If the MBMS data is transferred to the UE with the mode of Re199, the UE can learn about which the received MBMS service is according to the NSAPI of corresponding bearer, i.e., the UE can learn about the corresponding MBMS service identifier.

Figure 8:
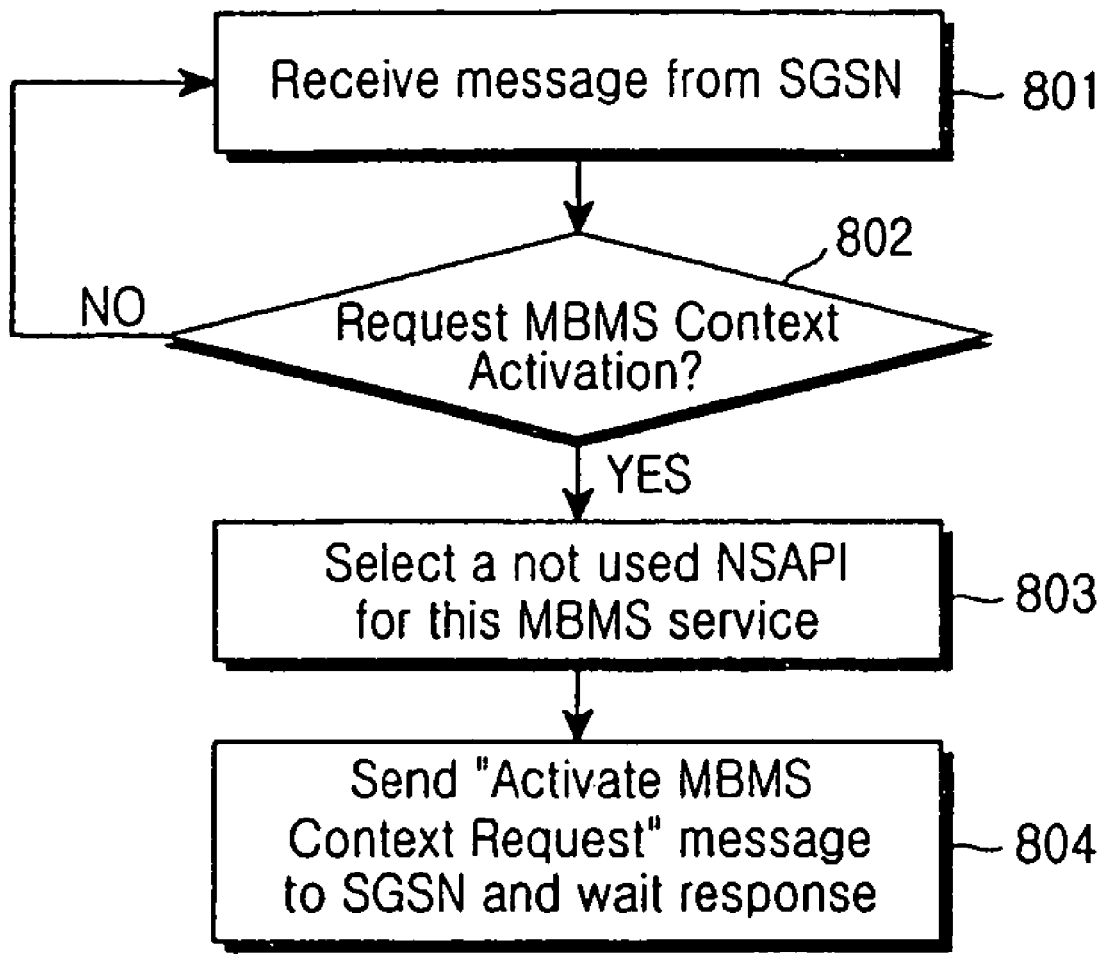
FIG. 8 shows the UE operation during the procedure that UE derives the mapping of MBMS service identifier and the RAB identifier.

FIG. 8 shows the operation flow of the UE during the process that UE allocates the mapping relationship between the MBMS service identifier and the RAB identifier.

801 the UE receives message from the SGSN. 802 If the message that the UE receives from the SGSN is the message of "MBMS Context Activation Request", 803 then the UE selects the unused NSAPI for this MBMS service. 804 the UE sends the "Activate MBMS Context Request" message to the SGSN, which contains the IP multicast address, the APN and the NSAPI.

Figure 9:
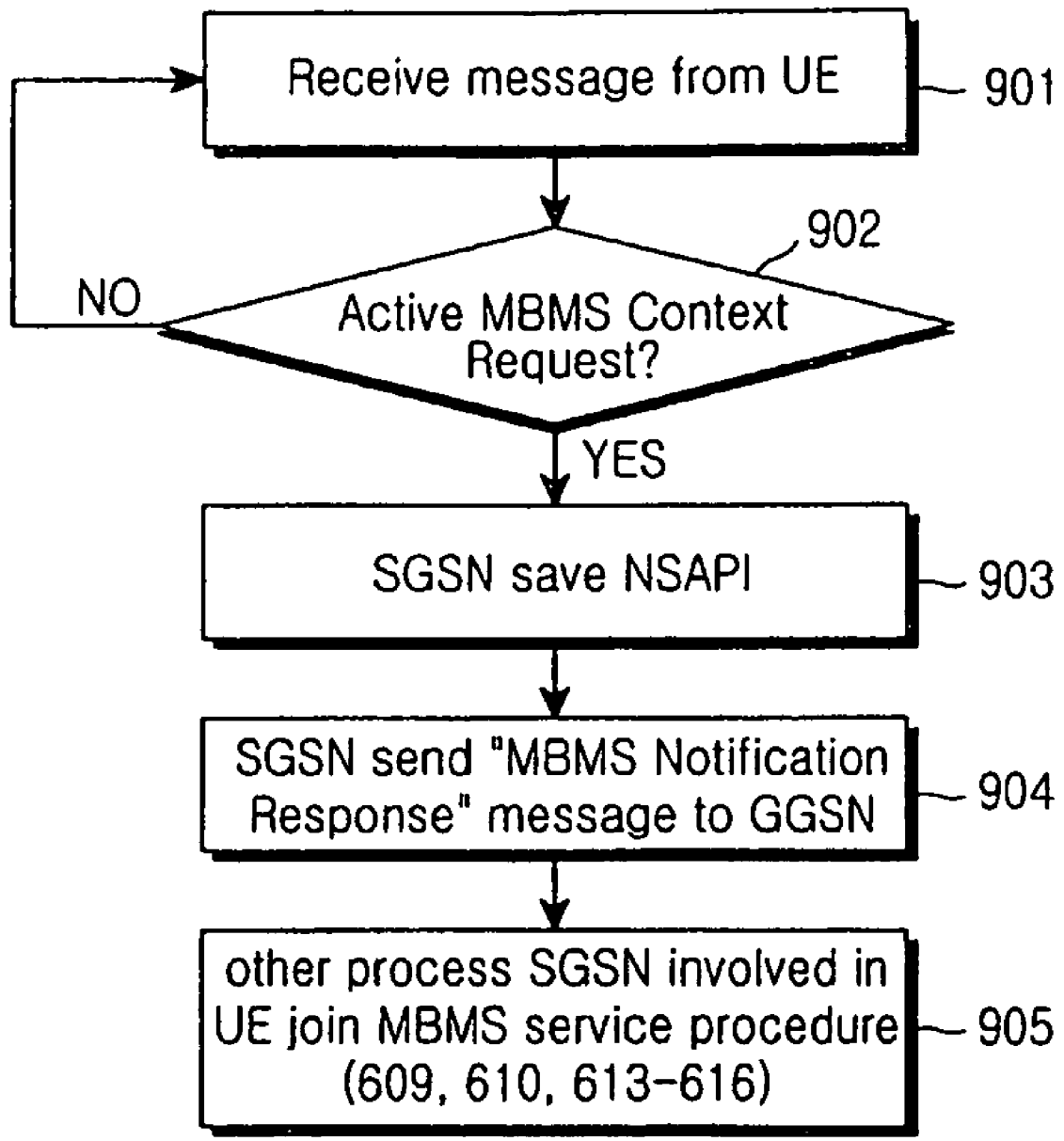
FIG. 9 shows the SGSN operation during the procedure that the UE derives the mapping of MBMS service identifier and the RAB identifier.

FIG. 9 shows the operation flow of the SGSN during the process that the UE allocates the mapping relationship between the MBMS service identifier and the RAB identifier.

901 the SGSN receives the message from the UE. 902 If the message that SGSN receives from the UE is "Activate MBMS Context Request", 903 then the SGSN saves the NSAPI included in the message. 904 the SGSN sends the "MBMS Notification Response" message to the GGSN. This message contains the value of reason. The value of reason indicates whether the MBMS context is activated successfully for the SGSN or the UE or not. 905 the SGSN carries out the process that other UEs join in the MBMS service with the attendance of the SGSN. FIG. 6 illustrates following processes: the safe encryption one, the one that the SGSN sends the "MBMS Context Generation Request" message to the GGSN and wait for response, the one that the SGSN establishes the bearer context with the GGSN after it receives the response message, the one that the SGSN provides MBMS UE context to the RAN after it receives the response message, and the one that the SGSN sends the "Activate MBMS Context Accept" message to the UE. All the processes are based on the prior art, therefore, the detailed technical contents are omitted here.

Figure 10:
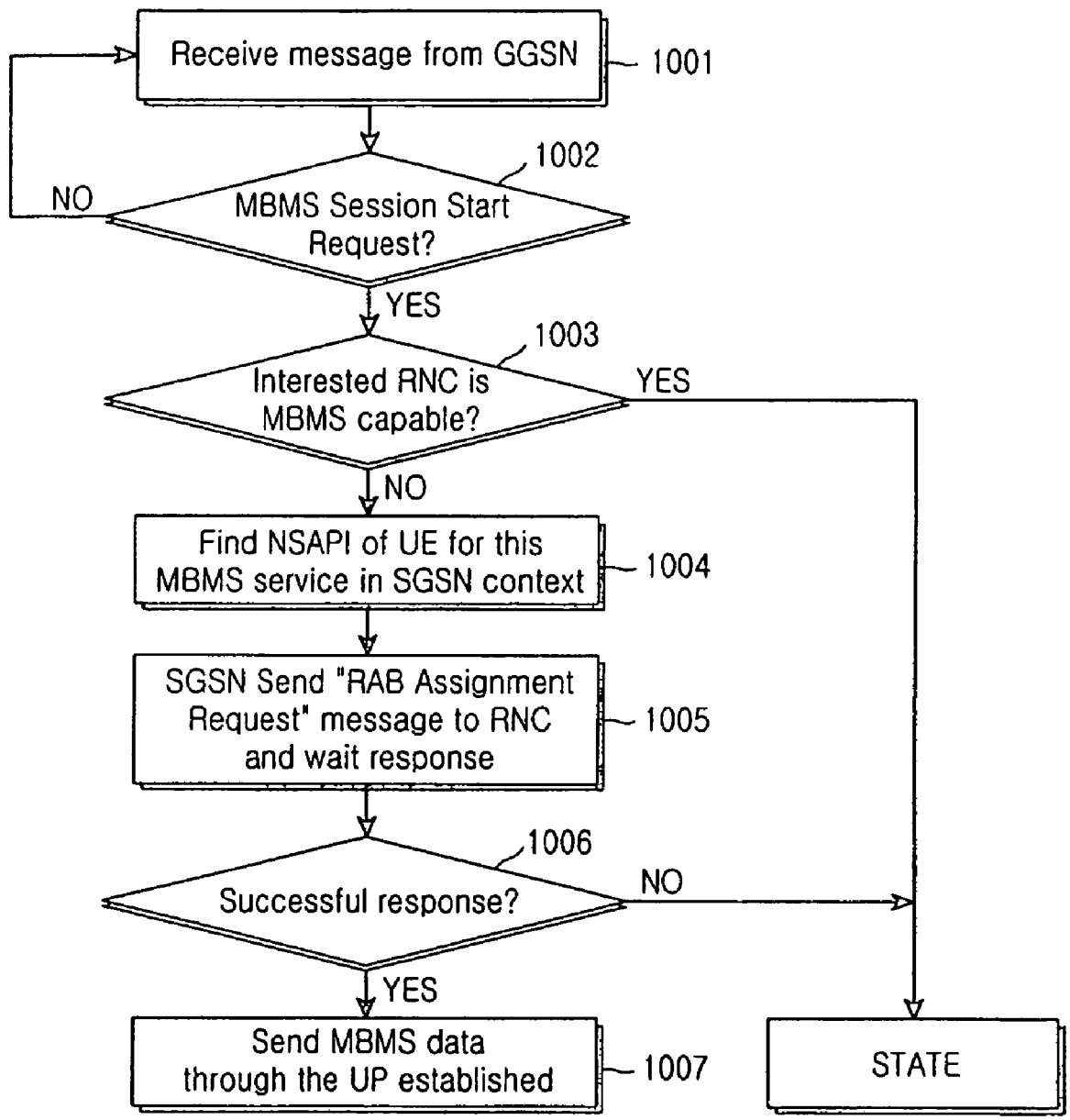
FIG. 10 shows the SGSN operation when MBMS session starts in the case of UE derives the mapping of the MBMS service identifier and the RAB identifier.

FIG. 10 shows the operation flow of the SGSN when the MBMS session starts during the UE allocates the mapping relationship between the MBMS service identifier and the RAB identifier.

1001 the SGSN receives the message from the GGSN.

1002 If the message that the SGSN receives from the GGSN is "MBMS Session Start",

1003 then the SGSN judges whether the interested RNC supports the MBMS or not. The method for judgment is consistent with that illustrated in FIGS. 3 and 7. The process flow of the RNC that supports the MBMS is based on the prior art, therefore, detailed technical contents are omitted here. If the interested RNC does not support the MBMS, 1004 the SGSN searches for the SGSN context for the NSAPI and QoS parameters of MBMS service for the UE and generates the "RAB Allocation Request" message.

1005 the SGSN sends the "RAB Allocation Request" message to the corresponding RNC and waits for response.

1006 If the SGSN receives the message of successful RAB allocation, 1007 it transfers the MBMS data to the UE via the established user interface.

When the UE is joining in the MBMS service which is in operation (i.e., the SGSN receives the "Activate MBMS Context Request" message from the UE, and sends the "Activate MBMS Context Response" message to the UE after it exchanges information with the GGSN, as shown form step 206 to 215 in FIG. 2), or when the UE is moving into the MBMS service which is in operation (i.e., the SGSN receives messages of the "Routing Area Update", the "MBMS Service Request" with the reason of "MBMS Service" and so on), the operation flow of the SGSN is in accordance with that carried out when the MBMS session starts on condition that the UE locates in the MBMS service area but the RNC in which the UE locates does not support the MBMS.

What is claimed is:

1. A method for supporting backward compatibility of MBMS (Multimedia Broadcast and Multicast Service) comprising steps of:
   receiving a Session Start message from a GGSN (Gateway GPRS (General Packet Radio Service) Support Node) by a SGSN (Service GPRS Support Node) when the SGSN requires to send a MBMS data including a MBMS Session Start to a UE;
   receiving an Activate MBMS Context Request message from the UE by the SGSN and sending an Activate MBMS Context Accept message to the UE with the information exchange with the GGSN when the UE joins in the case of the MBMS session is in operation;
   receiving a Service Request message or a Routing Area Update message for the reason of MBMS Service from the UE by the SGSN when the UE move in with the MBMS session is in operation;
   judging whether an interested RNC (Radio Network Controller) supports the MBMS or not by the SGSN;
   sending the MBMS service to the interested UEs of the RNC in the mode of Re199 by the SGSN if the RNC cannot support the MBMS; and
   sending a RAB (Radio Access Bearer) Allocation Request message to the RNC by the SGSN to establish 1u user interface bearer for the UE, the RAB Allocation Request message contains a RAB identifier of the UE corresponding to the MBMS service.

2. The method according to claim 1, further comprising a step of allocating the RAB identifier for the MBMS service of the UE by the SGSN,
   wherein the step of allocating comprising steps of:
   allocating the mapping relationship between the MBMS service identifier and the RAB identifier by the SGSN when the SGSN needs to send the MBMS data to the UE if the RNC does not support the MBMS;
   sending a Return to Re199 Mode message to the UE and waiting for response by the SGSN if the RNC does not support MBMS;
   receiving the Return to Re199 Mode message by the UE from the SGSN;
   saving the correspondence relationship between the MBMS service identifier and the RAB identifier contained in the message by the UE;
   sending a Return to Re199 Mode Conformation message to the SGSN by the UE;
   receiving the Return to Re199 Mode Conformation message from the UE by the SGSN; and
   sending a RAB Allocation Request message to the RNC by the SGSN.

3. The method according to claim 2, wherein the Return to Re199 Mode message contains information elements of MBMS service identifier and the mapping relationship between the MBMS service identifier and the RAB identifier.

4. The method according to claim 2, wherein the Return to Re199 Mode Conformation message contains the information element of the MBMS service identifier.

5. The method of allocating a RAB (Radio Access Bearer) identifier for MBMS (Multimedia Broadcast and Multicast Sservice) of a UE, comprising steps of:
   receiving a MBMS Context Activation Request message from a SGSN (Service GPRS(General Packet Radio Service) Support Node) by the UE;
   allocating a NSAPI (Network Service Access Point Identifier) for the MBMS service;
   sending an Activate MBMS Context Request message by the UE to the SGSN;
   receiving an Activate MBMS Context Request message by the SGSN from the UE; and
   sending a RAB Allocation Request message by the SGSN to a RNC (Radio Network Controller) if the RNC does not support MBMS when the SGSN needs to transfer the MBMS data to the UE, and the RAB Allocation Request message contains RAB identifier corresponding to the NSAPI saved in the SGSN context.

6. The method according to claim 5, wherein the Activate MBMS Context Request message contains the NSAPI allocated for the MBMS service by the UE.

7. A method for establishing MBMS (Multimedia Broadcast and Multicast Service) bearer with a RNC(Radio Network Controller) which is incapable of MBMS, comprising steps of:
   receiving a Session Start message from a GGSN (Gateway GPRS (General Packet Radio Service) Support Node) by a SGSN (Service GPRS Support Node) to send the Session Start message to a UE;
   receiving an Activate MBMS Context Request message from the UE by the SGSN and sending a response message for the request message;
   receiving a Service Request message or a Routing Area Update message with a cause value regarding to the MBMS service from the UE by the SGSN;
   sending a RAB Allocation Request message to the RNC by the SGSN to establish the MBMS bearer for the UE, if the RNC cannot support the MBMS; and
   sending a MBMS data to the UE which is located in the RNC by the SGSN with the bearer.

8. A method of claim 7, wherein the RAB Allocation Request message contains a RAB identifier corresponding to the MBMS service.

* * * * *